(12) United States Patent
Foor et al.

(10) Patent No.: US 10,384,498 B2
(45) Date of Patent: Aug. 20, 2019

(54) ASSEMBLY FOR A TIRE INFLATION SYSTEM AND THE TIRE INFLATION SYSTEM MADE THEREWITH

(71) Applicant: DANA HEAVY VEHICLE SYSTEMS GROUP, LLC, Maumee, OH (US)

(72) Inventors: William J. Foor, Clayton, MI (US); Steven J. Strandlund, Columbia City, IN (US)

(73) Assignee: Dana Heavy Vehicle Systems Group, LLc, Maumee, OH (US)

( * ) Notice: Subject to any disclaimer, the term of this patent is extended or adjusted under 35 U.S.C. 154(b) by 127 days.

(21) Appl. No.: 15/544,314

(22) PCT Filed: Feb. 4, 2016

(86) PCT No.: PCT/US2016/016557
§ 371 (c)(1),
(2) Date: Jul. 18, 2017

(87) PCT Pub. No.: WO2016/126936
PCT Pub. Date: Aug. 11, 2016

(65) Prior Publication Data
US 2018/0009278 A1    Jan. 11, 2018

Related U.S. Application Data

(60) Provisional application No. 62/112,851, filed on Feb. 6, 2015, provisional application No. 62/163,560, filed on May 19, 2015.

(51) Int. Cl.
*F16K 15/20* (2006.01)
*B60C 29/00* (2006.01)
(Continued)

(52) U.S. Cl.
CPC .......... *B60C 29/005* (2013.01); *B60C 23/003* (2013.01); *B60C 29/06* (2013.01); *B60C 29/064* (2013.01); *F16K 15/20* (2013.01)

(58) Field of Classification Search
CPC ..... B60C 29/005; B60C 23/003; B60C 29/06; B60C 29/064; F16K 15/20
(Continued)

(56) References Cited

U.S. PATENT DOCUMENTS 1,288,821 A    12/1918 Broderick
1,301,508 A    4/1919 Schroder
(Continued)

FOREIGN PATENT DOCUMENTS

JP    2008002513 A    1/2008

OTHER PUBLICATIONS

European Patent Office, International Search Report with Written Opinion, dated May 17, 2016, 8 pages, European Paent Office, Rijswijk, Netherlands.

*Primary Examiner* — Minh Q Le
(74) *Attorney, Agent, or Firm* — Marshall & Mehlhorn, LLC

(57) ABSTRACT

An assembly for a tire inflation system includes a tire stem. A housing is engaged with a first end of the tire stem. The housing comprises a fluid conduit extending therethrough and a first adapter secured to a second adapter. The second adapter receives the first end of the tire stem and a first end of the first adapter. The first end of the tire stem and the first end of the first adapter abut each other. A valve is disposed in the fluid conduit and positioned within the first adapter. A depressor member is attacked to the first end of the first adapter and provided in the fluid conduit. The depressor member extends away from the valve and toward the tire stem. A seal member is disposed in a groove in the second adapter and provided around an outer surface of the tire stem.

17 Claims, 5 Drawing Sheets

(51) Int. Cl.
*B60C 23/00* (2006.01)
*B60C 29/06* (2006.01)

(58) Field of Classification Search
USPC ........ 137/231, 224, 226; 152/415, 416, 417, 152/429; 73/146.8
See application file for complete search history.

(56) References Cited

U.S. PATENT DOCUMENTS

| | | | |
|---|---|---|---|
| 1,311,898 A | 8/1919 | Jackson | |
| 1,442,933 A | 1/1923 | Firpo | |
| 1,724,063 A * | 8/1929 | Anderson | B60C 23/0496 137/225 |
| 1,939,249 A | 12/1933 | Berger | |
| 3,037,544 A * | 6/1962 | Gouirand | B60C 23/007 137/225 |
| 3,065,763 A * | 11/1962 | Howard | B60C 29/007 137/223 |
| 3,799,589 A * | 3/1974 | Boelkins | F16L 27/0832 285/281 |
| 3,994,312 A * | 11/1976 | Tanner | B60C 23/0496 137/226 |
| 4,660,590 A * | 4/1987 | Sanchez | B60C 23/0496 137/226 |
| 4,895,199 A * | 1/1990 | Magnuson | B60C 23/003 137/102 |
| 5,437,301 A * | 8/1995 | Ramsey | B60P 7/065 137/231 |
| 5,553,647 A * | 9/1996 | Jaksic | B60C 23/003 152/415 |
| 5,754,101 A * | 5/1998 | Tsunetomi | B60C 23/0496 340/442 |
| 6,220,836 B1 * | 4/2001 | Wu | F04B 33/005 137/231 |
| 6,382,268 B1 * | 5/2002 | Lin | F16K 15/20 137/231 |
| 6,651,689 B1 | 11/2003 | Stech | |
| 6,856,245 B2 | 2/2005 | Smith et al. | |
| 7,493,808 B2 * | 2/2009 | Milanovich | B60C 23/0496 116/34 R |
| 7,509,969 B2 * | 3/2009 | Huang | F16K 15/026 137/226 |
| 7,963,297 B2 * | 6/2011 | Huang | F04B 33/005 137/223 |
| 7,975,739 B1 | 7/2011 | Ingram | |
| 8,146,413 B1 * | 4/2012 | Grace | B60C 29/06 73/146.8 |
| 8,245,722 B2 * | 8/2012 | Huang | F04B 33/005 137/223 |
| 8,402,987 B2 * | 3/2013 | Wang | B60S 5/043 137/223 |
| 8,757,194 B2 * | 6/2014 | Huang | B60C 29/06 137/223 |
| 2005/0000568 A1 * | 1/2005 | Nikolayev | F16L 37/23 137/231 |
| 2008/0029194 A1 * | 2/2008 | Conroy | B60C 29/02 152/415 |
| 2008/0047613 A1 | 2/2008 | Huang | |
| 2009/0032158 A1 * | 2/2009 | Rudolf | B60C 23/003 152/415 |
| 2009/0095359 A1 * | 4/2009 | Campau | B60C 23/0496 137/226 |
| 2012/0125446 A1 * | 5/2012 | Chuang | B60C 29/06 137/231 |
| 2012/0234401 A1 * | 9/2012 | Wu | F16L 37/00 137/231 |
| 2013/0206249 A1 * | 8/2013 | Wu | F04B 33/00 137/231 |
| 2014/0014197 A1 * | 1/2014 | Renaker | B60C 25/18 137/231 |
| 2014/0261939 A1 * | 9/2014 | Therber | B60C 23/003 152/415 |
| 2015/0224832 A1 * | 8/2015 | Hsiao | B60C 23/0496 73/146.8 |

\* cited by examiner

ASSEMBLY FOR A TIRE INFLATION SYSTEM AND THE TIRE INFLATION SYSTEM MADE THEREWITH

CROSS-REFERENCE TO RELATED APPLICATIONS

This application is claiming the benefit, under 35 U.S.C. 119(e), of the provisional U.S. patent application which was granted Ser. No. 62/112,851 and filed on Feb. 6, 2015 and the provisional U.S. patent application which was granted Ser. No. 62/163,560 and filed on May 19, 2015, the entire disclosures of which are hereby incorporated by reference.

BACKGROUND OF THE INVENTION

The invention relates to an assembly for a tire inflation system. The invention also relates to a tire inflation system having the assembly.

Tire inflation systems such as, for example, central tire inflation systems can be utilized to manually and/or automatically increase the pressure within a tire to a desired level. However, known tire inflation systems suffer from leakage and maintenance issues due to poor design. Additionally, tire inflation systems may utilize hoses which can rupture under certain conditions and cause a system and/or tire failure.

Therefore, it would be desirable to provide an assembly and a system which improves on the known designs by addressing the above-described deficiencies.

BRIEF SUMMARY OF THE INVENTION

Embodiments of an assembly for a tire inflation system are provided. In an embodiment, the assembly comprises a tire stem. A housing is engaged with a first end of the tire stem. The housing comprises a fluid conduit extending therethrough and a first adapter secured to a second adapter. The second adapter receives the first end of the tire stem and a first end of the first adapter. The first end of the tire stem and the first end of the first adapter abut each other. A valve is disposed in the fluid conduit and positioned within the first adapter. A depressor member is attached to the first end of the first adapter and provided in the fluid conduit. The depressor member extends away from the valve and toward the tire stem. A seal member is disposed in a groove in the second adapter and provided around an outer surface of the tire stem.

Embodiments of a tire inflation system are also provided. In an embodiment, the tire inflation system comprises a tire stem in fluid communication with a tire on an end thereof. A housing is engaged with a first end of the tire stem. The housing comprises a fluid conduit extending therethrough and a first adapter secured to a second adapter. The second adapter receives the first end of the tire stem and a first end of the first adapter. The first end of the tire stem and the first end of the first adapter abut each other. A valve is disposed in the fluid conduit and positioned within the first adapter. A depressor member is attached to the first end of the first adapter and provided in the fluid conduit. The depressor extends away from the valve and toward the tire stem. An O-ring seal member is disposed in an annular groove defined by a reduced thickness portion of the second adapter. The O-ring seal member is provided at an end of the fluid conduit and around an outer surface of the tire stem.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION OF THE INVENTION

Figure 1:
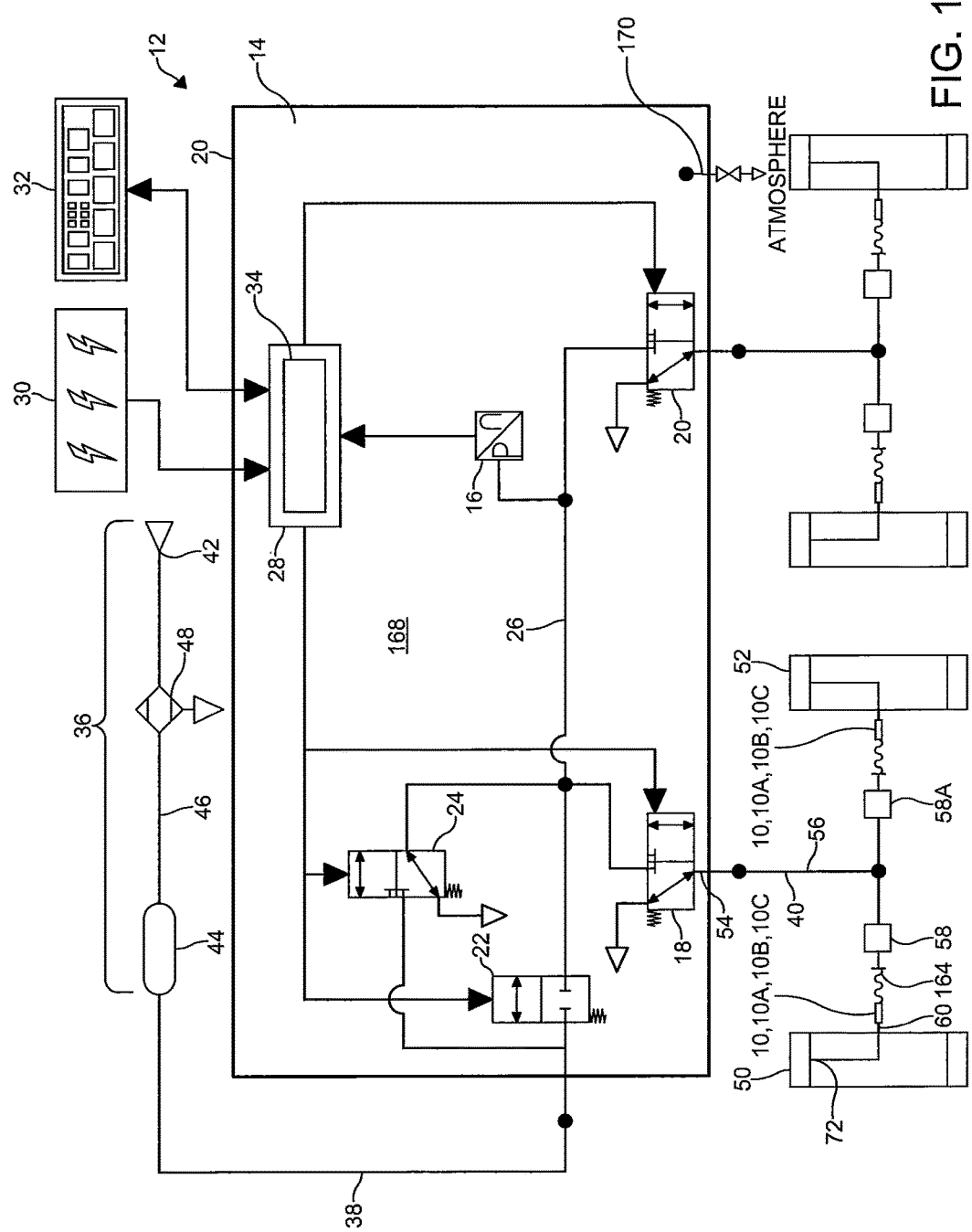
FIG. 1 depicts a schematic view of an embodiment of a tire inflation system in accordance with the invention.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an assembly 10, 10A, 10B, 10C for a tire inflation system and the tire inflation system 12 made therewith are described below. Preferably, the tire inflation system is utilized with a vehicle (not depicted). More preferably, the tire inflation system is a central tire inflation system (CTIS), for a commercial vehicle. However, the tire inflation system described herein may have applications in vehicles for both light and heavy duty and for passenger, commercial, and off-highway vehicles. Furthermore, it would be understood by one of ordinary skill in the art that the tire inflation system could have industrial, locomotive, military and aerospace applications.

A schematic illustration showing embodiments of the assembly 10, 10A, 10B, 10C and an embodiment of the tire inflation system 12 are illustrated in FIG. 1. The tire inflation system 12 will be described with reference to a pressurized fluid such as, for example, air. The tire inflation system may have inflate and/or deflate capability to allow a tire pressure to increased and/or decreased.

The tire inflation system 12 may comprise a control unit 14. The control unit 14 comprises a pressure sensor 16 for measuring the pressure of air. Preferably, the control unit 14 also comprises a plurality of valve assemblies 18, 20, 22, 24, which are of the solenoid variety, and a first fluid conduit 26 for controlling the flow of and directing air through the system 12.

The control unit 14 also comprises an electronic control portion 28. The electronic control portion may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 outputs signals to the valve assemblies 18-24 to open or close the valve assemblies 18-24. The electronic control portion 28 may also output signals to a display device (not depicted). The display device may be included as a part of the operator control device 32 or a freestanding device.

The control unit 14 selectively communicates with an air supply 36 via an air supply circuit 38. The pressure sensor 16 measures the pressure of the air supply 36 via the air supply circuit 38 and the first fluid conduit 26. The control unit 14 also preferably comprises a control valve assembly 24. The control valve assembly 24 is provided with an orifice which is smaller than the orifice of the supply valve assembly 22 and is utilized to provide a bleed of air from the air supply 36 to a fluid control circuit 40. Preferably, the supply valve assembly 22 and control valve assembly 24 are of the solenoid variety as mentioned above.

The air supply 36 is utilized to check the tire pressure and, if needed, increase and/or decrease the tire pressure. The air supply 36 is preferably provided by an air compressor 42 attached to the vehicle. Preferably, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. Preferably, fluid communication between the control unit 14 and fluid control circuit 40 is controlled by opening or closing a channel valve assembly 18.

Each tire 50, 52 houses air at a certain pressure which is referred to herein as tire pressure. Preferably, the tire pressure is equal to a target tire pressure. The target tire pressure can be selected to be a desired pressure. After the target tire pressure is selected, it is programmed into the control unit 14. The assembly 10, 10A, 10B, 10C and tire inflation system 12 will be described below with reference to checking, increasing and/or decreasing the tire pressure. If it is determined that the tire pressure is less than the target tire pressure, the tire pressure can be increased. If it is determined that the tire pressure is greater than the target tire pressure, the tire pressure can be decreased. Also, the assembly 10 and tire inflation system 12 will be described below with reference to the tire pressure of one tire 50. However, the tire inflation system 12 may at certain times be in fluid communication with a plurality of tires 50, 52 in order to perform the aforementioned functions.

Referring now to FIGS. 1-7, the fluid control circuit 40 comprises the assembly 10, 10A, 10B, 10C. The fluid control circuit 40 will be described with reference to one assembly 10, 10A, 10B, 10C. However, as illustrated in FIG. 1, the fluid control circuit 40 may comprise a plurality of assemblies 10, 10A, 10B, 10C. For example, a first assembly 10, 10A, 10B, 10C associated with a tire 50 on a drive axle of the vehicle could be provided and a second assembly 10, 10A, 10B, 10C associated with another tire 52 on the drive axle could be provided. Preferably, the first assembly 10, 10A, 10B, 10C and the second assembly 10, 10A, 10B, 10C are similarly configured. The fluid control circuit 40 may also comprise one or more fluid conduits 54, 56 and one or more rotary seal assemblies 58, 58A.

Figure 4:
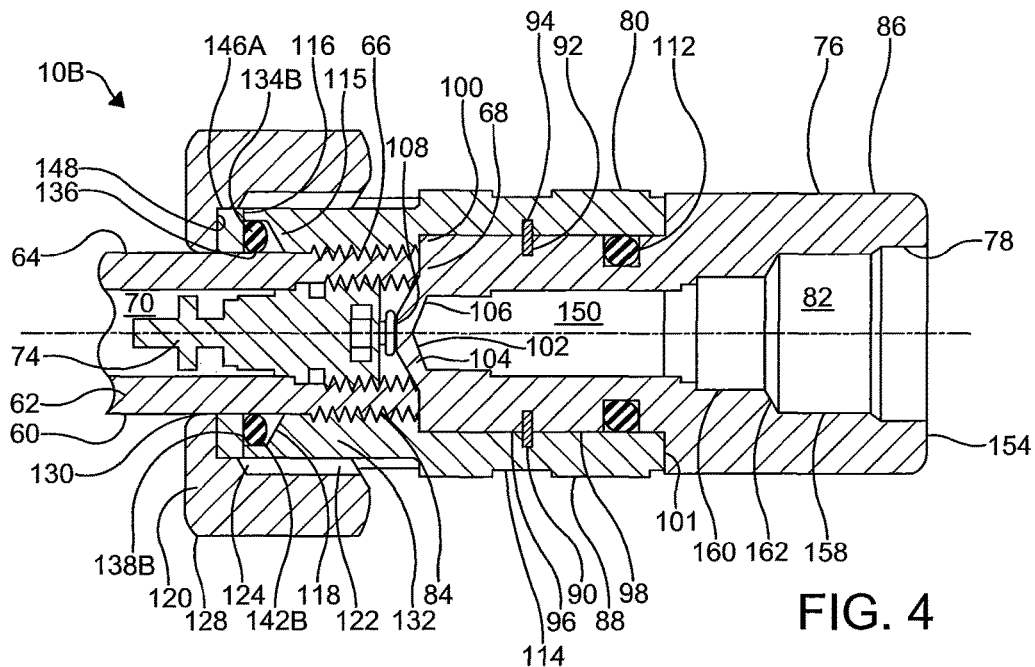
FIG. 4 is a cross-sectional view of yet another embodiment of the portion of the tire inflation system of FIG. 1 including a portion of yet another embodiment of the assembly in accordance with the invention.
Figure 5:
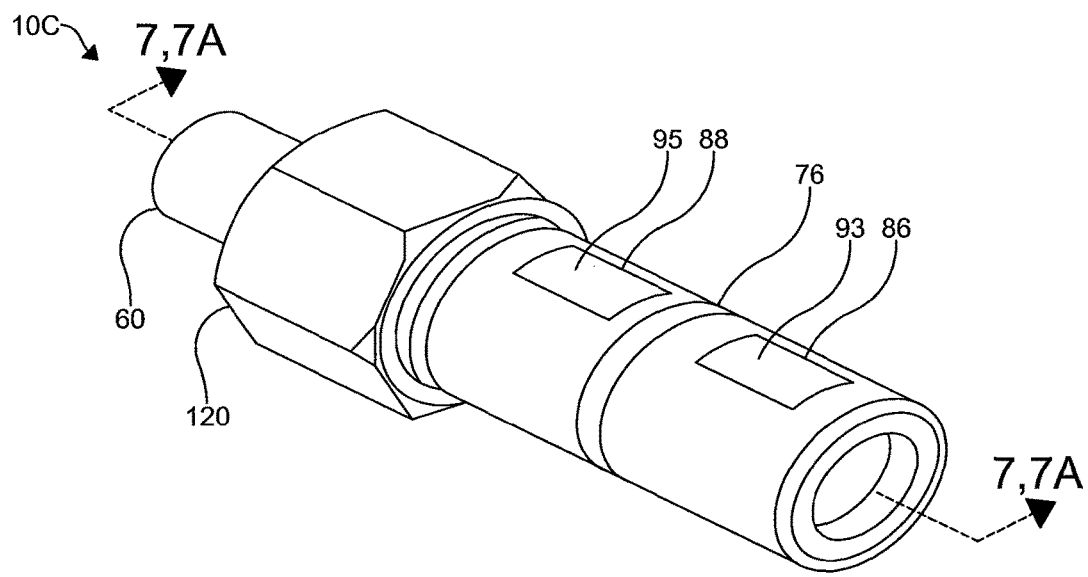
FIG. 5 is a perspective view of still another embodiment of a portion of the tire inflation system of FIG. 1 including still another embodiment of the assembly in accordance with the invention.

A tire stem 60 extends out from the tire 50. The tire stem 60 comprises an elongated hollow cylindrical portion 62. As best illustrated in FIGS. 2-7A, the cylindrical portion 62 has an outer surface 64 which is generally smooth and of a constant diameter. A threaded portion 66 is provided near a first end 68 of the tire stem 60. A conduit 70 extends through the cylindrical portion 62. The conduit 70 is utilized to direct pressurized air to and from the tire 50. The first end 68 of the tire stem 60 is in fluid communication with the assembly 10, 10A, 10B, 10C. A second end 72 of the tire stem 60 is in fluid communication with the tire 50. As illustrated in FIGS. 4, 7 and 7A, a tire valve 74 is housed within the tire stem 60 and positioned in the conduit 70. Preferably, the tire valve 74 is of the Schrader variety.

A housing 76 is engaged and in fluid communication with the tire stem 60 at the first end 68 thereof. The housing 76 has an inner surface 78 and an outer surface 80. The inner surface 78 of the housing 76 defines a fluid conduit 82 extending through the housing 76. The threaded portion 66 of the tire stem 60 is engaged with a threaded portion 84 provided in the fluid conduit 82. The outer surface 80 of the housing 76 may have a portion which is knurled, of a hexagonal shape, flat or otherwise adapted so as to be engaged by a suitable fastening device.

The housing 76 may be formed in a unitary manner. Preferably, as shown best in FIGS. 4, 6, 7 and 7A, the housing 76 comprises a first adapter 86 and a second adapter 88. In these embodiments, and as shown on FIG. 5, a portion 93 of an outer surface 96 of the first adapter 86 is flat and a portion 95 of an outer surface 97 of the second adapter 88 is flat so as to be adapted to be engaged a fastening device. In one such embodiment, another portion of the outer surface of the second adapter 88 is knurled.

Preferably, the first adapter 86 and second adapter 88 are permanently secured to each other. Also, it is preferred that the first adapter 86 and second adapter 88 are rotatable with respect to each other. To secure the first adapter 86 to the second adapter 88, a male end 100 of the first adapter 86 is disposed in a female end 101 of the second adapter 88. In certain embodiments, a fastening member 90 such as, for example, one or more snap rings, is provided in corresponding grooves 92, 94 formed in the outer surface 96 of the first adapter 86 and an inner surface 98 of the second adapter 88. In an embodiment, like the one illustrated in FIGS. 6-7, two fastening members 90 are provided in the grooves 92, 94. In this embodiment, each fastening member 90 is a snap ring. The snap rings permanently secure the first adapter 86 to the second adapter 88 and allow the first adapter 86 and the second adapter 88 to rotate relative to each other. In another embodiment, like the one illustrated in FIG. 7A, the fastening member 90A is an elongated cylindrical member. In an embodiment, the elongated cylindrical member is a wire. In this embodiment, separate portions of the wire are disposed in the grooves 92, 94 formed in the outer surface 96 of the first adapter 86 and the inner surface 98 of the second adapter 88. Preferably, the wire is flexible so that it can be positioned in the housing 76 after the male end 100 of the first adapter 86 is disposed in the female end 101 of the second adapter 88. The wire permanently secures the first adapter 86 to the second adapter 88 and allows the first adapter 86 and the second adapter 88 to rotate relative to each other. Thus, it is preferred that the wire is made of a durable material such as metal.

The second adapter 88 receives the first end 68 of the tire stem 60 and the male end 100 of the first adapter 86. Within the second adapter 88, the first end 68 of the tire stem 60 and the male end 100 of the first adapter 86 abut. A depressor member 102 is attached to the male end 100 of the first adapter 86 and extends therefrom toward the tire stem 60. The depressor member 102 comprises a pair of opposed legs 104, 106 which extend into the fluid conduit 82 and are attached to a flat circular head 108. The depressor member 102 extends past the first end 68 of the tire stem 60 to continuously contact and depress a portion of the tire valve 74. Contact between the depressor member 102 and the tire valve 74 provides the tire valve 74 in an open position and enables continuous fluid communication between the tire 50 and the assembly 10, 10A, 10B, 10C allowing the assembly 10, 10A, 10B, 10C to communicate directly with the pressurized air in the tire 50.

A sealing member 110 such as, for example, an O-ring is provided between the first adapter 86 and the second adapter 88 to ensure a fluid tight connection therebetween. Preferably, the sealing member 110 is made from an elastomeric material. The sealing member 110 is provided in an annular groove 112 formed in the outer surface 96 of the first adapter 86 to provide a seal between the first adapter 86 and the second adapter 88. Also, in these embodiments, the threaded portion 84 provided in the fluid conduit 82 is provided as a portion of the second adapter 88.

The second adapter 88 comprises a wall portion 114 which is of a generally cylindrical shape. A portion 115 of the wall portion 114, which is adjacent a first end 116 of the second adapter 88, gradually reduces in thickness toward the first end 116 of the second adapter 88. The reduced thickness portion 115 of the second adapter 88 defines a groove 118. Preferably, the groove 118 is annular and provided circumferentially about the first end 116 of the second adapter 88.

The first end 116 of the second adapter 88 is a female end and it receives the first end 68 of the tire stem 60. In certain embodiments, like the ones shown in FIGS. 2-3, the first end 116 of the second adapter 88 also abuts a portion of a retaining member 120. In other embodiments, like the ones shown in FIGS. 4, 7, and 7A, the first end 116 of the second adapter 88 abuts an annular member 146A. The retaining member 120 and the second adapter 88 are engaged via a threaded connection 122 between a threaded portion provided on an inner surface 124 of the retaining member 120 and a threaded portion provided on the outer surface 97 of the second adapter 88.

The retaining member 120 may have an outer surface 128 which has a portion which is knurled, of a hexagonal shape or otherwise adapted so as to be engaged by a fastening device. The retaining member 120 has a center aperture 130 which is disposed around a portion of the outer surface 64 of the tire stem 60 and a first end portion 132 of the housing 76. The retaining member 120 is threadably connected to the outer surface 80 of the housing 76. More particularly, the retaining member 120 is disposed around and threadably connected to the outer surface 97 of the second adapter 88. In an embodiment, the retaining member 120 is a nut.

A seal member 134, 134A, 134B is provided at or near the end of the fluid conduit 82 and between the retaining member 120 and the second adapter 88 to ensure a fluid tight connection. The seal member 134, 134A, 134B has a central aperture 136 which is fitted around the outer surface 64 of the tire stem 60. The seal member 134, 134A, 134B is disposed in the groove 118 defined by the reduced thickness portion 115 of the second adapter 88. In this position, the seal member 134, 134A, 134B abuts the outer surface 64 of the tire stem 60 and the reduced thickness portion 115 of the second adapter 88 and provides a seal therebetween. Preferably, the seal member 134, 134A, 134B is made from an elastomeric material.

The seal member 134, 134A, 134B has an outer surface 138, 138A, 138B. The outer surface 138, 138A, 138B defines an outer diameter of the seal member 134, 134A, 134B. In an embodiment like the one illustrated in FIG. 2, the outer diameter of the seal member 134, 134A, 134B gradually increases from a first end 140 of the outer surface 138 to a center portion 142 of the outer surface 138. In this embodiment, the outer diameter of the seal member 134 gradually decreases from the center portion 142 to a second end 144 of the outer surface 138. In another embodiment like the one illustrated in FIG. 3, the outer diameter of the seal member 134A is substantially constant from the first end 140A to the center portion 142A of the outer surface 138A. In this embodiment, the outer diameter of the seal member 134A gradually decreases from the center portion 142A to the second end 144A of the outer surface 138A. In other embodiments (not depicted), the outer diameter of the seal member is substantially constant from the first end to the second end of the outer surface. In still other embodiments like those illustrated in FIGS. 4, 7 and 7A, the seal member 134B is an O-ring with an outer diameter that is greatest at the center portion 142B of the outer surface 134B.

Figure 2:
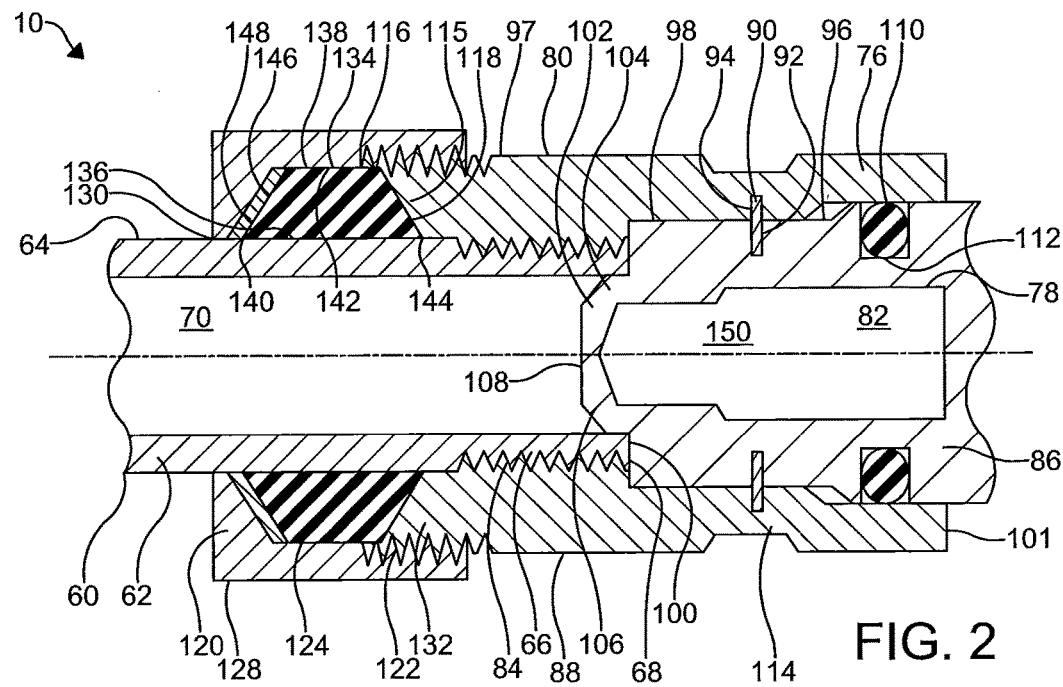
FIG. 2 is a cross-sectional view of an embodiment of a portion of the tire inflation system of FIG. 1 including a portion of an embodiment of an assembly in accordance with the invention.
Figure 3:
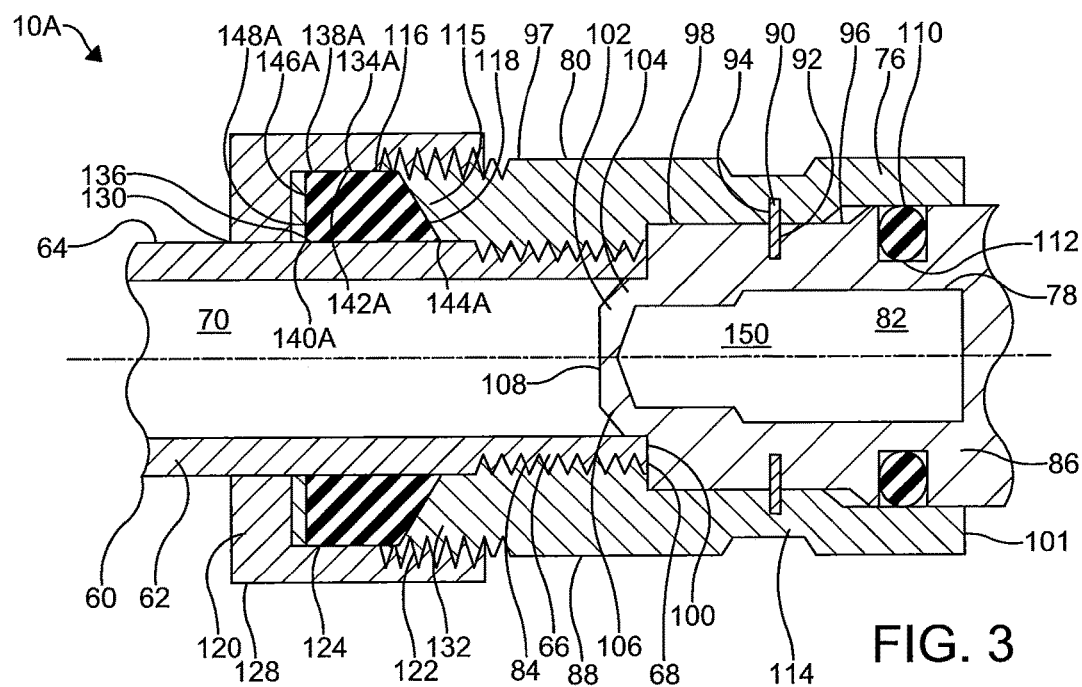
FIG. 3 is a cross-sectional view of another embodiment of the portion of the tire inflation system of FIG. 1 including a portion of another embodiment of the assembly in accordance with the invention.

An annular member 146, 146A also abuts the seal member 134, 134A, 134B. The annular member 146, 146A is disposed around the outer surface of the tire stem. Also, the annular member 146, 146A abuts an end wall 148 of the retaining member 120 and separates the seal member 134, 134A, 134B from the end wall 148. The annular member urges the seal member 134, 134A, 134B toward the reduced thickness portion 115 of the second adapter 88 to provide the seal around the outer surface 64 of the tire stem 60. In an embodiment, the annular member 146, 146A is a washer. Referring now to FIG. 2, in an embodiment, the annular member 146 may have a frusto-conical shape. In other embodiments like those illustrated in FIGS. 3, 4, 7 and 7A, the annular member 146A may have parallel upper and lower surfaces.

Portions of the fluid conduit 82 are provided in each of the first adapter 86 and the second adapter 88. As shown in FIGS. 4 and 7, the portion 150 of the fluid conduit 82 provided in the first adapter 86 reduces in diameter from a female end 154 of the first adapter 86 toward the male end 100 of the first adapter 86 which is provided in the second adapter 88. In this embodiment, the portion of the fluid conduit provided in the first adapter may comprise a first diameter portion 158 and a second diameter portion 160. The first diameter portion 158 comprises a diameter which is greater that a diameter of the second diameter portion 160. The first diameter 158 portion comprises a threaded portion 161. Preferably, the diameter of the second diameter portion 160 is substantially constant. A transition diameter portion 162 may separate the first diameter portion 158 from the second diameter portion 160. The transition diameter portion 162 comprises a diameter which gradually reduces from the first diameter portion 158 to the second diameter portion 160.

The first adapter 86 and the second adapter 88 each have a female end 154, 116. The tire stem 60 is attached to the second adapter 88 through the female end 116 thereof and the male end 100 of the first adapter 86 is received in the second female end 101 of the second adapter 88. As illustrated in FIG. 1, a hose assembly 164, or the like, is attached to the first adapter 86 at the female end 154 thereof. Preferably, a first male end of the hose assembly 164 is received in the female end 154 of the first adapter 86. In this embodiment, the hose assembly 164 may be attached to the first adapter 86 via a threaded connection.

The hose assembly 164 is permanently attached to the first adapter 86. The hose assembly 164 has a conduit that, on an end, is in fluid communication with the fluid conduit 82 and, on an opposite end, another portion of the tire inflation system 12. Pressurized air is communicated from the air supply 36 to the fluid conduit 82 through the hose assembly 164 to a valve 166 in order to check, increase and/or decrease the tire pressure.

Figure 6:
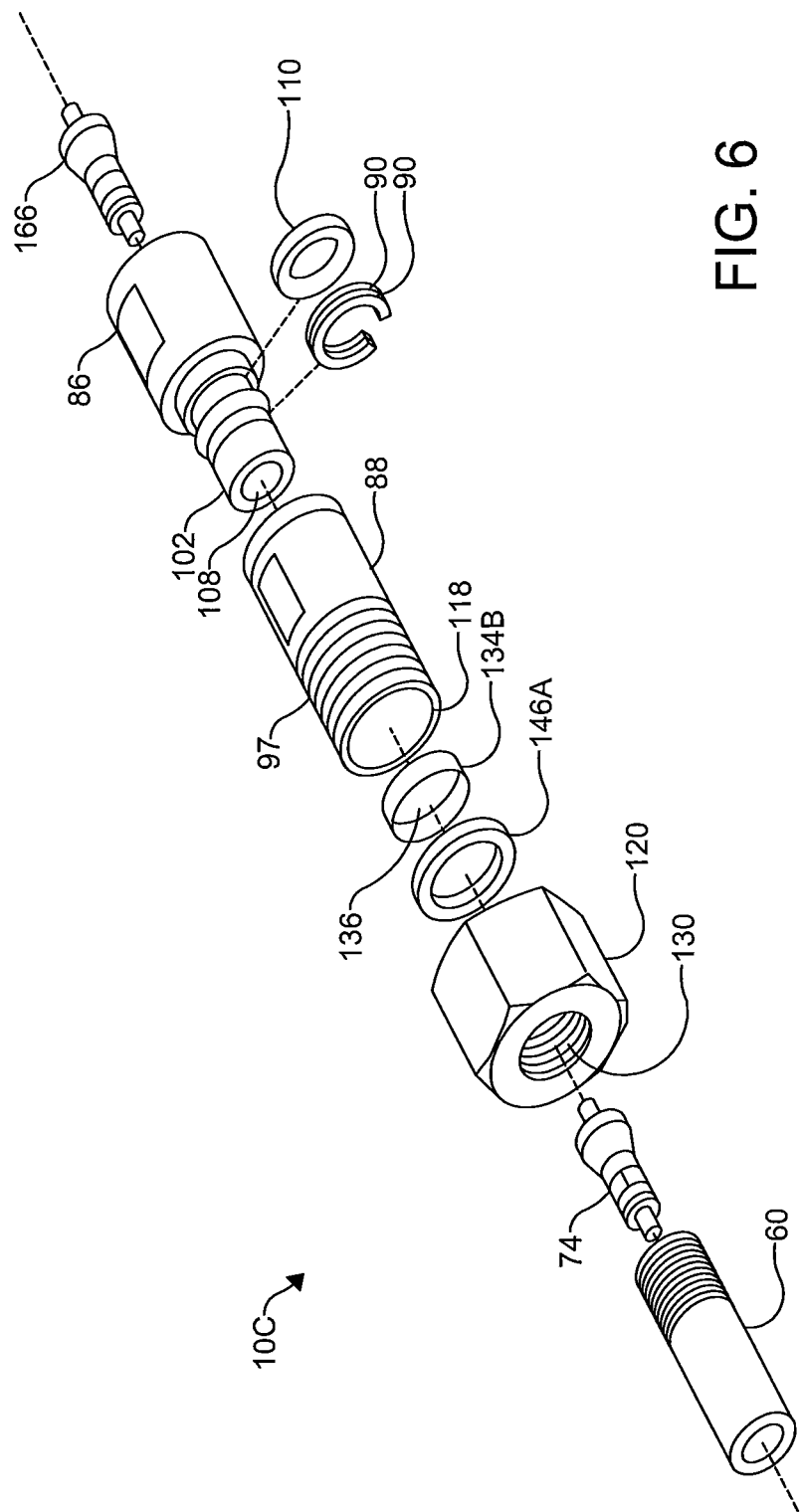
FIG. 6 is an exploded view of the portion of the tire inflation system of FIG. 5 and the assembly of FIG. 5.
Figure 7:
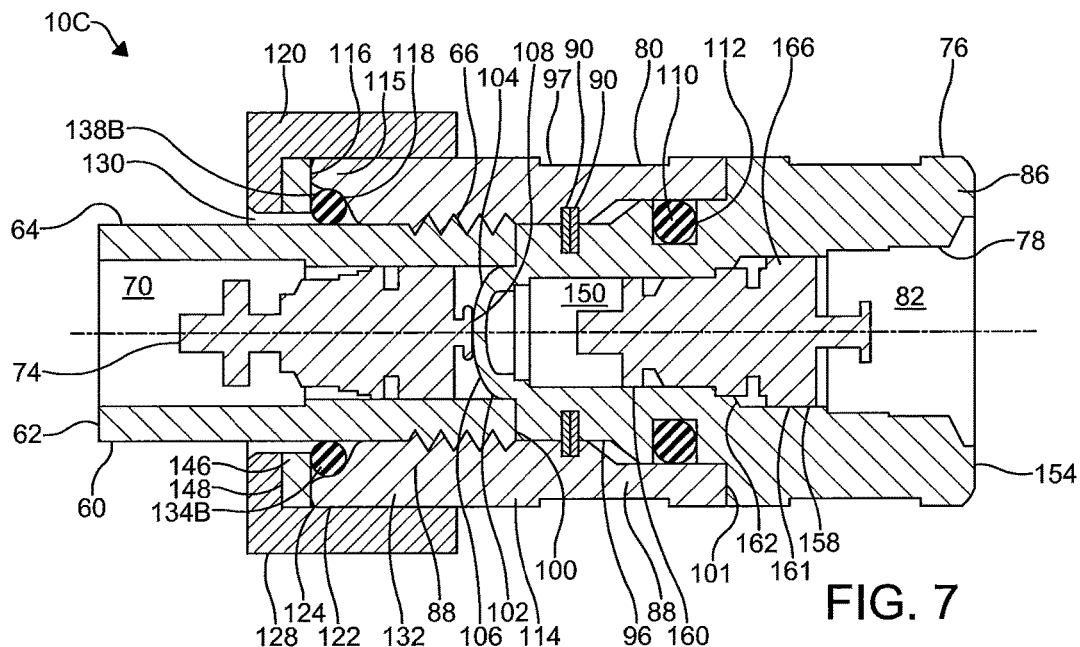
FIG. 7 is a cross-sectional view of the portion of the tire inflation system of FIG. 5 and the assembly of FIG. 5.
Figure 7A:
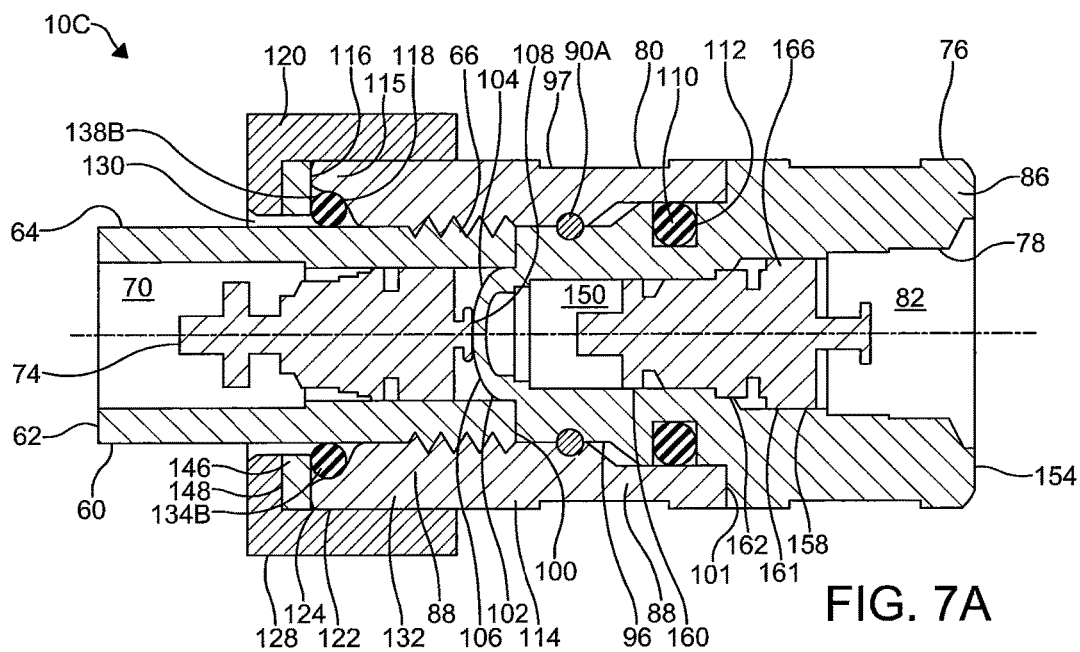
FIG. 7A is a cross-sectional view of another embodiment the portion of the tire inflation system of FIG. 5 and the assembly of FIG. 5.

Referring now to FIGS. 6, 7 and 7A, the valve 166 is disposed in the fluid conduit 82. As illustrated in FIGS. 7 and 7A, in certain embodiments, the valve 166 is positioned within the first adapter 86. In these embodiments, the valve 166 is disposed so that it is positioned in the first diameter portion 158, second diameter portion 160 and the transition diameter portion 162 of the first adapter 86. In this position, the valve 166 is attached to the first adapter 86 via the threaded portion 161 of the first diameter portion 158 of the fluid conduit. Also, the valve 166 is positioned as described above, a seal is provided between the first adapter 86 and an outer surface of the valve at the transition diameter portion 162 of the fluid conduit.

The valve 166 is moveable from an open position to a closed position and vice versa. During a tire pressure check or when the tire pressure is being increased, the valve 166 is in or placed into an open position. Preferably, the valve 166 is of the check valve variety.

In embodiments where the valve 166 is a check valve, the valve 166 moves to an open position when air pressure in the fluid control circuit 40 is greater than the tire pressure. In these embodiments, the air supply 36 may be utilized to urge the valve 166 to an open position. To open the valve 166, the air supply 36 is placed into fluid communication with the valve 166. Once the air supply 36 is in fluid communication with the valve 166, the air supply 36 is maintained in fluid communication with the valve 166 for a predetermined time to urge the valve 166 to an open position. The valve 166 is urged to the open position due to the pressure difference between the air supply 36 and the tire pressure. Once open, the valve 166 can be maintained in an open position for a predetermined period of time to check, increase and/or decrease the tire pressure to the target tire pressure. The valve 166 can be maintained in an open position utilizing bleed air.

After the tire pressure has been checked, increased and/or decreased to the target tire pressure, the fluid control circuit 40 including the assembly 10, 10A, 10B, 10C is vented to the atmosphere. Venting the fluid control circuit 40 urges the valve 166 to the closed position. The valve 166 is urged into the closed position by the pressure difference between the atmosphere and the tire pressure. Thus, the valve 166 provides selective fluid communication between the tire 50 and the remaining portion(s) of the tire inflation system 12.

Venting the fluid control circuit 40 prevents the hose assembly 164 from being in constant communication with the tire pressure which improves the useful life of the assembly 10, 10A, 10B, 10C and the system 12. Referring back now to FIG. 1, the fluid control circuit 40 is vented by directing a flow of the pressurized air in the fluid control circuit 40 and assembly 10 into a chamber 168. The chamber 168 is provided within and is defined by the control unit 14. The chamber 168 is in fluid communication with the atmosphere via a passage 170. After pressurized air is received in the chamber 168, the passage 170 directs the pressurized air in the chamber 168 to the atmosphere.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. An assembly for a tire inflation system, comprising:
a tire stem;
a housing engaged with a first end of the tire stem, the housing comprising a fluid conduit extending therethrough and a first adapter secured to a second adapter, the second adapter receiving the first end of the tire stem and a first end of the first adapter, wherein the first end of the tire stem and the first end of the first adapter abut each other;
a valve disposed in the fluid conduit and positioned within the first adapter;
a depressor member attached to the first end of the first adapter and provided in the fluid conduit, the depressor member extending away from the valve and toward the tire stem;
a seal member disposed in a groove in the second adapter and provided around an outer surface of the tire stem; and
an annular member which abuts the seal member and separates the seal member from an end wall of a retaining member, the annular member urging the seal member toward the second adapter to provide a seal around the outer surface of the tire stem.

2. The assembly of claim 1, wherein the tire stem is in fluid communication with the housing at the first end thereof and is in fluid communication with a tire at a second end thereof.

3. The assembly of claim 1, further comprising a hose assembly received in and permanently attached to the first adapter and in fluid communication with the fluid conduit.

4. The assembly of claim 1, wherein the valve provides selective fluid communication between a tire and a remaining portion of the tire inflation system.

5. The assembly of claim 1, wherein the tire stem houses a Schrader valve which is in an open position.

6. The assembly of claim 1, wherein the first adapter is permanently secured to the second adapter via a fastening member, the fastening member being disposed in a groove formed in an outer surface of the first adapter and a groove formed in the inner surface of the second adapter.

7. The assembly of claim 6, wherein the fastening member is a metal wire.

8. The assembly of claim 1, wherein the depressor member contacts a tire valve housed within the tire stem to provide the tire valve in an open position and enable continuous fluid communication between a tire and the assembly.

9. The assembly of claim 1, wherein the seal member is formed from an elastomeric material and is an O-ring.

10. The assembly of claim 1, wherein the housing has an outer surface and a portion of the outer surface is knurled or is flat so as to be adapted to be engaged by a fastening device.

11. The assembly of claim 1, further comprising a retaining member having a center aperture which is disposed around an outer surface of the tire stem, the retaining member threadably connected to an outer surface of the housing.

12. The assembly of claim 1, wherein the second adapter comprises a wall portion that has a reduced thickness portion that gradually reduces in thickness toward an end of the housing and defines the groove.

13. The assembly of claim 1, wherein the first adapter comprises an outer surface and the outer surface has an annular groove formed therein and an O-ring is disposed in the annular groove to provide a seal between the first adapter and the second adapter.

14. The assembly of claim 1, wherein the first adapter and the second adapter are rotatable with respect to each other.

15. A tire inflation system, comprising:
a tire stem in fluid communication with a tire on an end thereof;
a housing engaged with a first end of the tire stem, the housing comprising a fluid conduit extending therethrough and a first adapter secured to a second adapter, the second adapter receiving the first end of the tire stem and a first end of the first adapter, wherein the first end of the tire stem and the first end of the first adapter abut each other;
a valve disposed in the fluid conduit and positioned within the first adapter;
a depressor member attached to the first end of the first adapter and provided in the fluid conduit, the depressor member extending away from the valve and toward the tire stem;
an O-ring seal member disposed in an annular groove defined by a reduced thickness portion of the second adapter and provided at an end of the fluid conduit and around an outer surface of the tire stem; and
an annular member which abuts the O-ring seal member and separates the O-ring seal member from an end wall of a retaining member, the annular member urging the seal member toward the second adapter to provide a seal around the outer surface of the tire stem.

16. The tire inflation system of claim 15, wherein the first adapter and the second adapter are permanently secured to each other and are rotatable with respect to each other.

17. The tire inflation system of claim 15, further comprising a washer disposed around the outer surface of the tire stem and abutting the O-ring seal, the washer urging the O-ring seal toward the reduced thickness portion of the second adapter to provide a seal between the outer surface of the tire stem and the reduced thickness portion of the second adapter.

* * * * *